(12) United States Patent
Goenka et al.

(10) Patent No.: US 12,174,892 B2
(45) Date of Patent: Dec. 24, 2024

(54) COMPUTERIZED SYSTEM AND METHOD FOR EXTRACTING ENTITY INFORMATION FROM TEXT COMMUNICATIONS AND DISPLAYING CONTENT BASED THEREFROM

(71) Applicant: YAHOO ASSETS LLC, Dulles, VA (US)

(72) Inventors: Mohit Goenka, Santa Clara, CA (US); Ashish Khushal Dharamshi, Sunnyvale, CA (US); Nikita Varma, Milpitas, CA (US)

(73) Assignee: YAHOO ASSETS LLC, New York, NY (US)

( * ) Notice: Subject to any disclaimer, the term of this patent is extended or adjusted under 35 U.S.C. 154(b) by 43 days.

(21) Appl. No.: 17/174,517

(22) Filed: Feb. 12, 2021

(65) Prior Publication Data
US 2021/0173875 A1 Jun. 10, 2021

Related U.S. Application Data

(63) Continuation of application No. 16/175,983, filed on Oct. 31, 2018, now Pat. No. 10,922,359.

(51) Int. Cl.
*G06F 16/00* (2019.01)
*G06F 16/903* (2019.01)
*G06N 5/048* (2023.01)

(52) U.S. Cl.
CPC ....... *G06F 16/90335* (2019.01); *G06N 5/048* (2013.01)

(58) Field of Classification Search
None
See application file for complete search history.

(56) References Cited

U.S. PATENT DOCUMENTS

| | | | |
|---|---|---|---|
| 9,170,716 B1 * | 10/2015 | Greenspan | G06F 9/451 |
| 2012/0059838 A1 | 3/2012 | Berntson et al. | |
| 2014/0096033 A1 * | 4/2014 | Blair | G06F 3/01 |
| | | | 715/752 |
| 2016/0034977 A1 * | 2/2016 | Bhaowal | H04L 51/046 |
| | | | 707/722 |
| 2016/0179943 A1 * | 6/2016 | Ku | G06F 16/38 |
| | | | 707/754 |
| 2017/0371898 A1 | 12/2017 | Sharma et al. | |
| 2018/0097768 A1 | 4/2018 | Ragsdale et al. | |
| 2018/0190050 A1 | 7/2018 | Pinney et al. | |

* cited by examiner

*Primary Examiner* — Anhtai V Tran
(74) *Attorney, Agent, or Firm* — James J. DeCarlo; Greenberg Traurig, LLP

(57) ABSTRACT

Disclosed are systems and methods for improving interactions with and between computers in content providing, searching and/or hosting systems supported by or configured with devices, servers and/or platforms. The disclosed systems and methods provide a novel framework for analyzing messages shared over a network and identifying information in them referencing entities based on a determined context of the messages. Once the entity information is identified, the disclosed framework segregates them based on the context, and then presents them in contextual views as content cards within or as part of generated, content-specific interfaces. The disclosed framework enables users to continue messaging while pivoting between different views of the generated interfaces, which enables the retrieval of additional information related to the entity information included on the content cards.

15 Claims, 9 Drawing Sheets

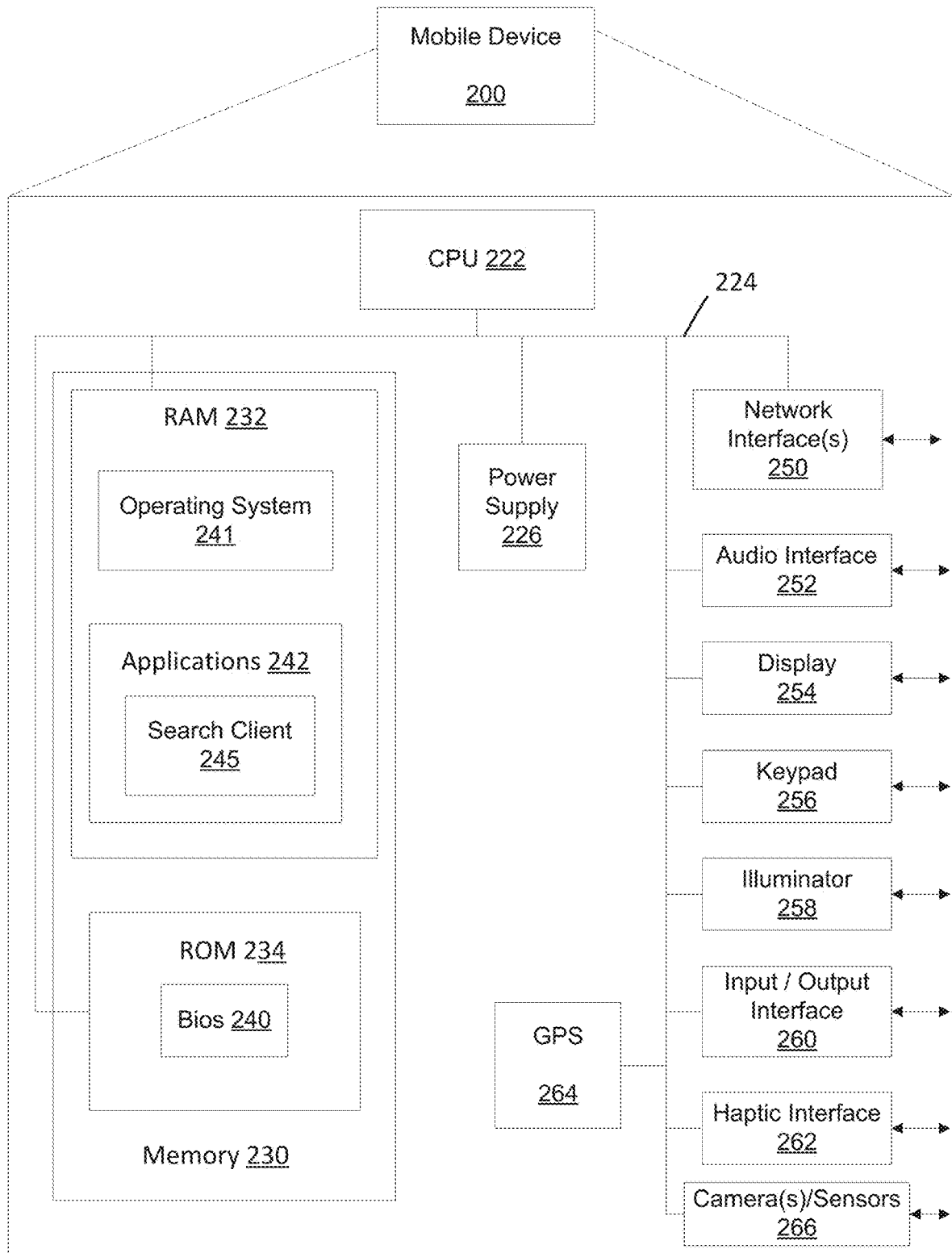

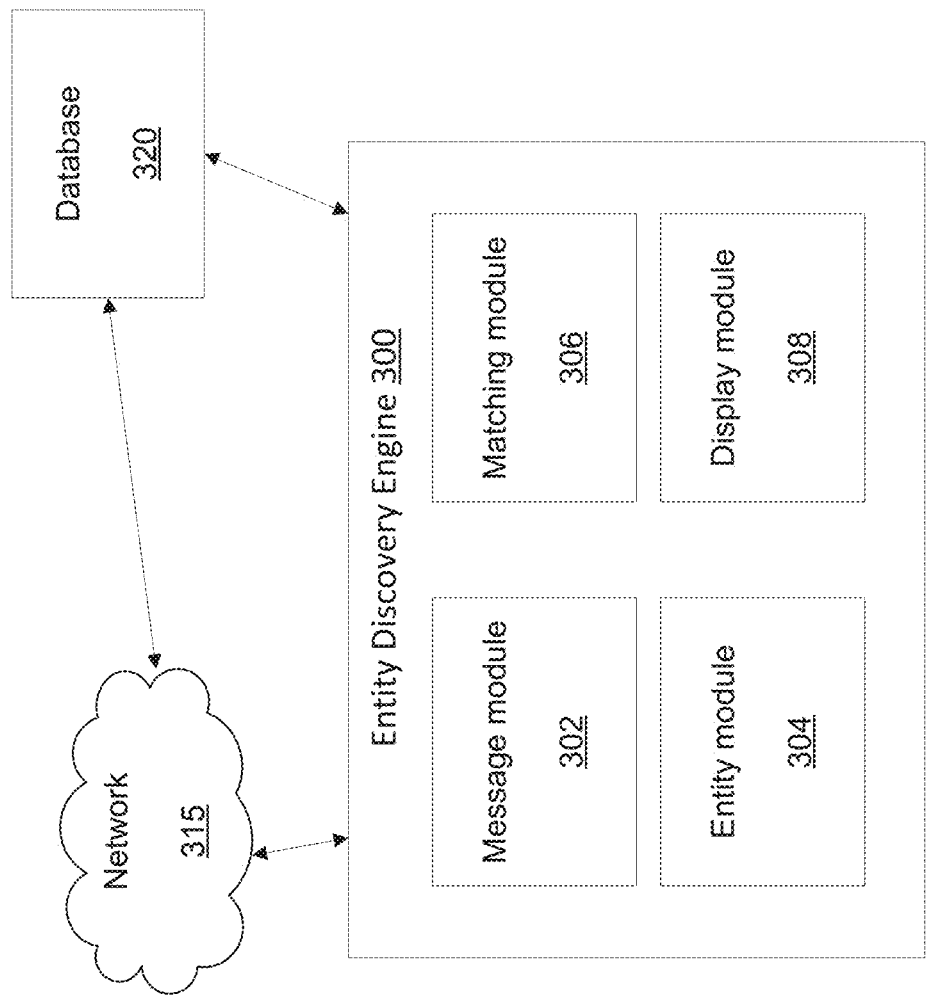

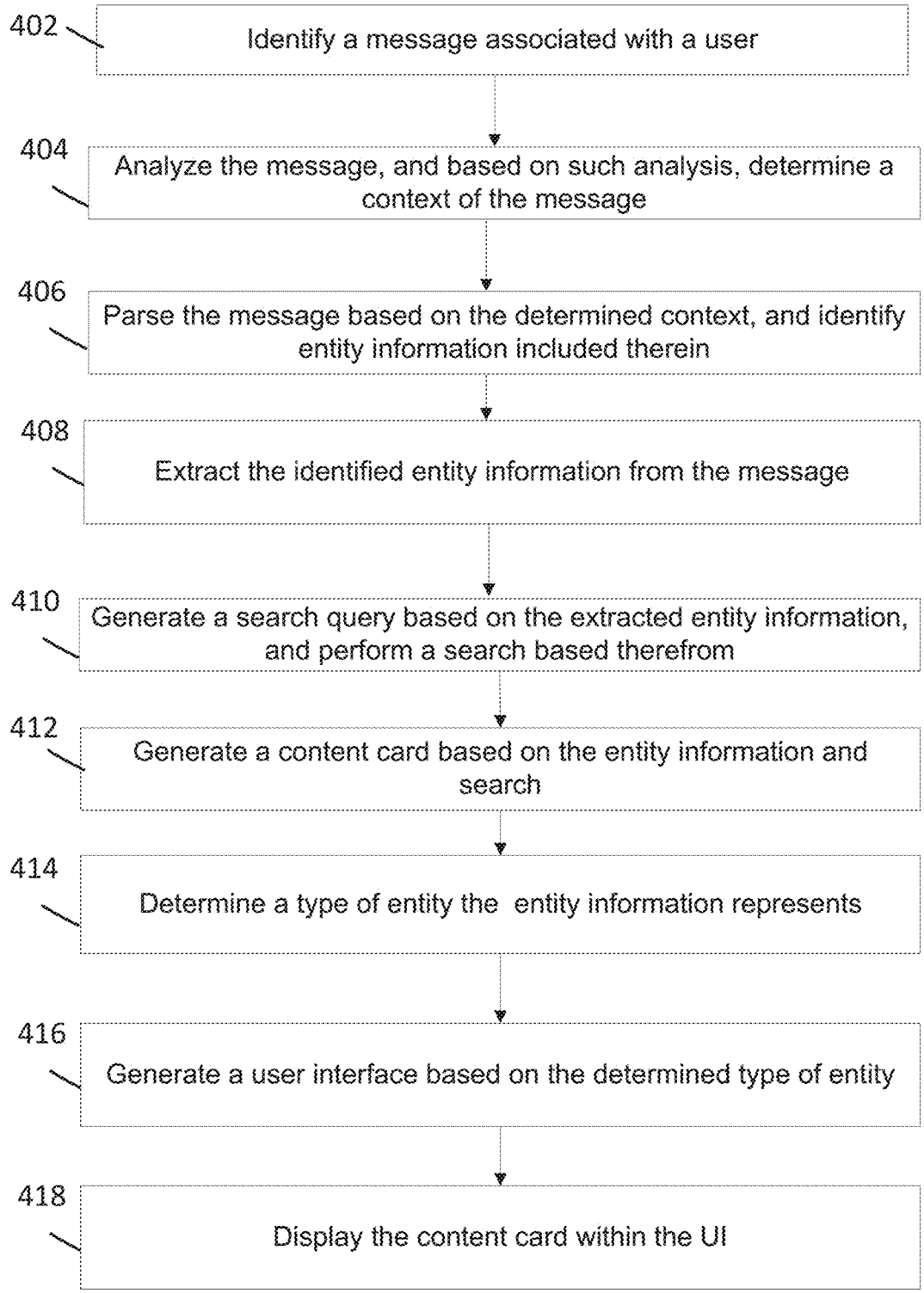

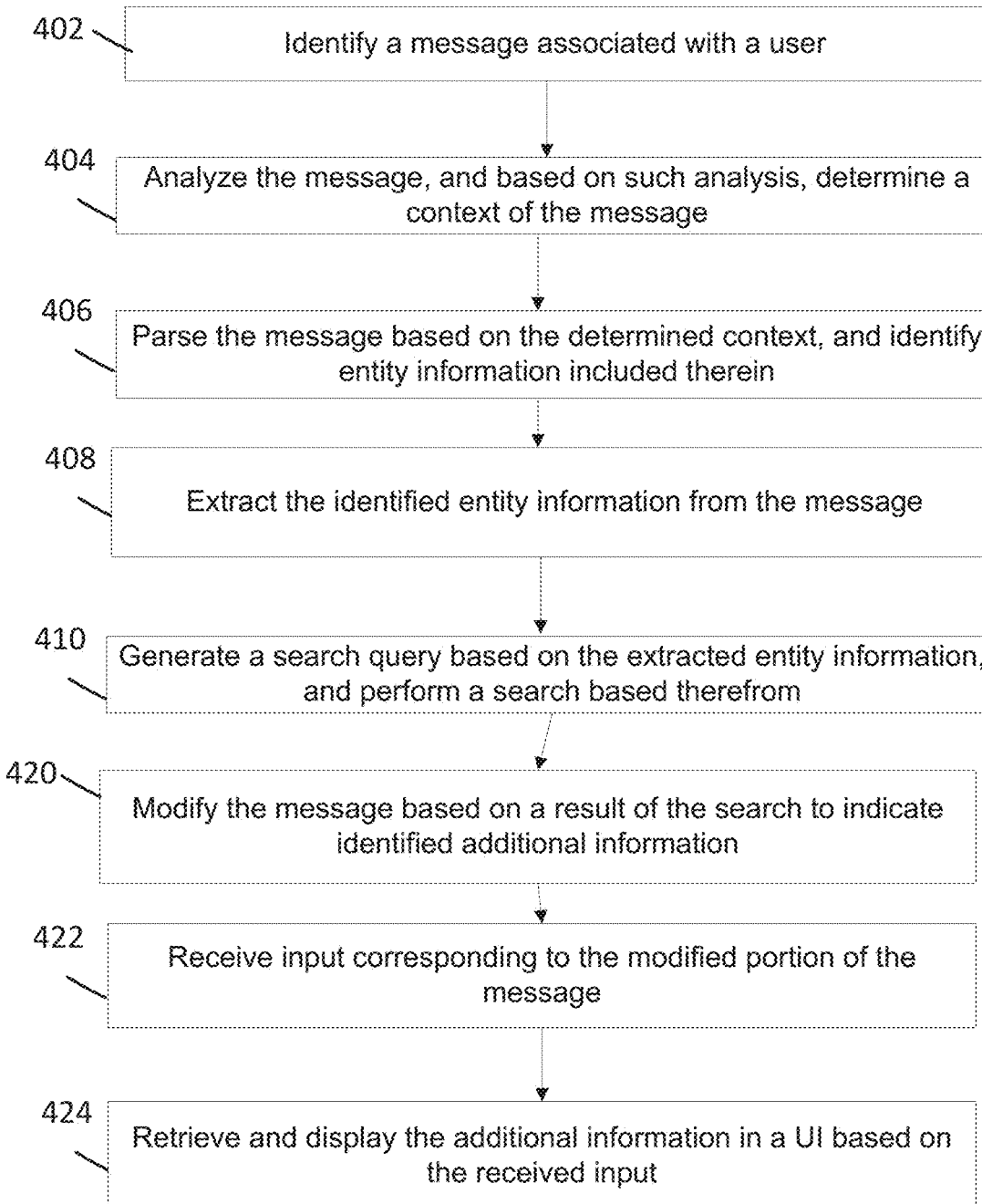

FIG. 5A

501a
To: Jim
From: Bob
Subject: Hockey Game?

Hey Jim,
Want to see the Bruins game at MSG?

501b
To: Bob
From: Jim
Subject: RE: Hockey Game?

Agreed. Let's buy tickets for the Bruins game.

FIG. 5C

To: Jim
From: Bob
Subject: Hockey Game?

Hey Jim,

Want to see the Bruins 🏒 game at MSG 📍?

501c

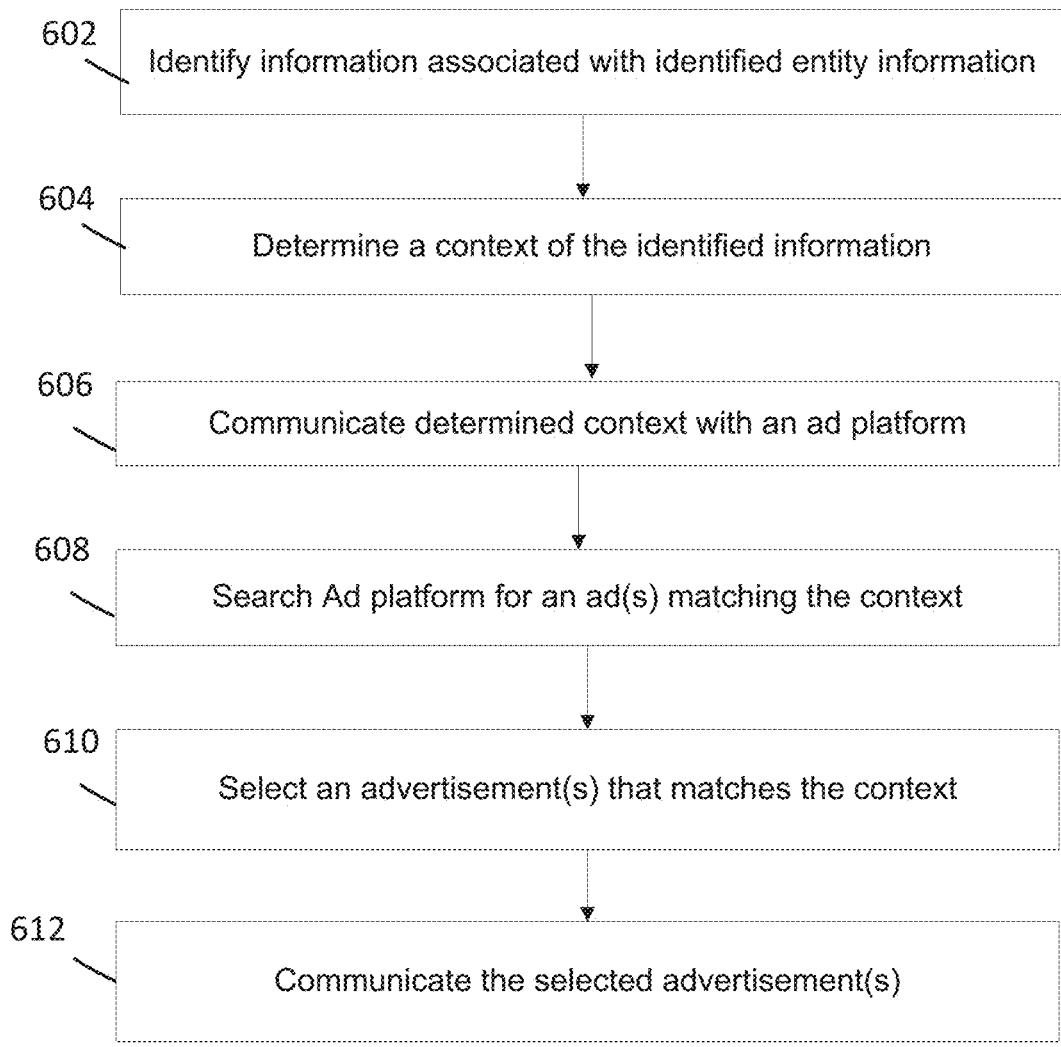

COMPUTERIZED SYSTEM AND METHOD FOR EXTRACTING ENTITY INFORMATION FROM TEXT COMMUNICATIONS AND DISPLAYING CONTENT BASED THEREFROM

This patent application claims the benefit of and is a continuation of U.S. patent application Ser. No. 16/175,983, filed on Oct. 31, 2018, now U.S. Pat. No. 10,922,359, which is incorporated by reference herein in its entirety.

This application includes material that is subject to copyright protection. The copyright owner has no objection to the facsimile reproduction by anyone of the patent disclosure, as it appears in the Patent and Trademark Office files or records, but otherwise reserves all copyright rights whatsoever.

FIELD

The present disclosure relates generally to improving the performance of network based computerized content hosting and providing devices, systems and/or platforms by modifying the capabilities and providing non-native functionality to such devices, systems and/or platforms through a novel and improved framework for extracting information from text portions of electronic communications available to the network, leveraging such information via specific search queries for the retrieval of additional content, and displaying such content in a modified graphical user interface in a manner that enables users to interact with the additional content through the modified UI.

BACKGROUND

In today's world, the exchange of information between users over the Internet drives social and economic industries. Information is exchanged in almost every form of electronic communication format, and typically includes textual information related to the crux of the communication's purpose. In conventional systems, for users to view, interact, use or otherwise act on the textual information contained within these messages, the users must copy-paste, or re-enter the information in a separate program/window. In certain situations, some programs, devices or platforms enable a user to click-on this information—for example, if the information is a phone number or address, clicking on the information can cause a link to be followed or a respective application to be launched to act on the information (e.g., clicking on the address loads a map application that shows the address).

However, at present, there is no technology, application or platform that allows users to seamlessly view or act upon (e.g., receive and/or interact with this information) in a consolidated view in an easily navigable and interactive graphical user interface (GUI). In fact, when information is shared by users within multiple messages, no system, platform or application exists that is able to extract, aggregate and display such information within a UI in a consolidated view.

SUMMARY

The disclosed systems and methods provide a technical solution to existing technical problems, especially those highlighted above, by providing a novel framework that provides an automatically created UI comprising a consolidated view of entity information extracted from messages associated with a user.

For purposes of this disclosure, the term "entity information" will be utilized to refer to the or important or relevant information included within shared messages. Entity information can include any type of information textually included within a message that is determined to be of importance to the user (and to the message's purpose). For example, entity information can include phone numbers, email addresses, physical addresses (zip codes, street names and numbers, cities, states, GPS coordinates, and the like), names (of people, restaurants, businesses, locations, events and the like), calendar events, website names, domain names, uniform resource locators (URLs), and the like.

According to embodiments of the instant disclosure, the disclosed framework involves analyzing messages shared over a network (e.g., sent to and from a set of users) and identifying information in them referencing entities (i.e., entity information) based on a determined context of the messages. Once the entity information is identified, the disclosed framework segregates the information according to its context, as needed, and then presents the information within a GUI (GUI and UI being used interchangeably herein) a customized, contextual view (e.g. content cards are presented for companies that represent the URLs; locations and addresses are displayed on a map; phone numbers are listed with names, and the like, as discussed in more detail below). Users may also pivot between different views (e.g., restaurants mentioned are shown on a map, but the user can pivot to a card view to view them in a list., and the like), as discussed in more detail below.

For example, a group of friends have exchanged phone numbers over emails. The disclosed systems and methods extract the phone number information from the messages, and create and display a consolidated user interface (UI) view that displays all the phone numbers exchanged within the emails along with the contact name in a list.

In another example, if a group of users is discussing concerts attended or concerts to attend, the disclosed framework can leverage this information into a search for the specific concert information (attended and planned), and generate a consolidated view of such information. For example, the generated display can list the concerts in a card view for the users to quickly browse. By way of non-limiting example, the cards can be interactive, such as by having linking or deep-linking features that enable the user to be taken to specific network locations to view other content, e.g. concert pictures, venue information or a ticket purchase site.

Thus, according to the disclosed systems and methods, users will no longer need to parse through the entire message chains to search for such entity information (or reference to particular types of information). The disclosed systems and methods provide a streamlined, automated mechanism where computerized network applications, devices and platforms can automatically present information extracted from the text or other data of multiple messages in a resource efficient manner, thereby reducing overall network usage and CPU cycles by reducing user search overhead and keystrokes. This has the additional benefit of providing users with an engaging and automatic tool that enables users to view, act on and/or save entity information for current and/or future purposes.

As stated above, there is no existing program, product, platform or service that has the capabilities of extracting entity information from plain text information within communications, and preparing and displaying a consolidated view of all such information extracted therefrom (e.g., from single messages, message series or entire message threads).

In some embodiments, as discussed in more detail below, the entity information extraction being performed by the disclosed framework is performed in the background during the transmission, reception and/or overall delivery of the messages (e.g., by the server upon relaying of the messages), such that an efficient, resource-saving process is tied to how the messages are communicated, which enables the extracted information to be presented in a more economical and less computationally draining manner through a compact and easy to navigate UI.

Indeed, as mentioned above, some conventional products (e.g., WhatsApp®) have the capabilities to identify simple entity information, such as addresses and time, from messages, which are then converted into hyperlinks which the user can click on to land on maps or calendars and the like. However, these existing products do not execute the disclosed functionality nor do they have the native capabilities to extract any plain text entity information, such as URLs referencing company websites, recipes, addresses, phone numbers and the like, from messages, then leverage such textual information in order to present content related thereto in a separate UI view that the user can consume and navigate with ease.

Thus, the disclosed "on-the-fly" entity identification and extraction, then consolidated UI generation are a few of the key technical differentiators between the disclosed framework and current in-market solutions. These technical improvements over existing systems enables a cost-effective approach for message analysis to occur as messages are shared and enables the device(s) performing such analysis to generate a previously unachievable result of providing a consolidated UI view of the message information, in real-time (or as the messages are delivered). For example, rather than relying on user devices to perform searches for specific message information after messages are delivered (with its associated CPU and network overhead), the disclosed framework enables the handling server to process the messages as they are being delivered, such that the entity information included therein is capable of readily and quickly being compiled and displayed, thereby eliminating the need for the user device to perform much if any processing other than displaying the provided consolidated view UI (e.g., what is received from the server).

For purposes of this disclosure, textual information contained within messages transmitted over a network will be discussed; however, it should not be construed as limiting, as any type of data included in a message can be analyzed and leveraged for providing the consolidated entity information view discussed herein. For example, such data can also include, but is not limited to, metadata, audio data, video data, image data, and/or any other type of known or to be known media, multi-media item or object capable of being included in, pointed to or referenced within a message.

In accordance with one or more embodiments, the instant disclosure provides computerized methods for a novel framework that extracts information from text within message communications and displays such information in a manner that enables users to act thereon. In accordance with one or more embodiments, the instant disclosure provides a non-transitory computer-readable storage medium for carrying out the above mentioned technical steps of the framework's functionality. The non-transitory computer-readable storage medium has tangibly stored thereon, or tangibly encoded thereon, computer readable instructions that when executed by a device (e.g., application server, email server, ad server, content server and/or client device, and the like) cause at least one processor to perform a method for a novel and improved framework for extracting information from text within communications and displaying such information in a manner that enables users to act therefrom.

In accordance with one or more embodiments, a system is provided that comprises one or more computing devices configured to provide functionality in accordance with such embodiments. In accordance with one or more embodiments, functionality is embodied in steps of a method performed by at least one computing device. In accordance with one or more embodiments, program code (or program logic) executed by a processor(s) of a computing device to implement functionality in accordance with one or more such embodiments is embodied in, by and/or on a non-transitory computer-readable medium.

BRIEF DESCRIPTION OF THE DRAWINGS

The foregoing and other objects, features, and advantages of the disclosure will be apparent from the following description of embodiments as illustrated in the accompanying drawings, in which reference characters refer to the same parts throughout the various views. The drawings are not necessarily to scale, emphasis instead being placed upon illustrating principles of the disclosure:

FIG. 2 depicts is a schematic diagram illustrating an example of client device in accordance with some embodiments of the present disclosure;

FIG. 3 is a block diagram illustrating components of an exemplary system in accordance with embodiments of the present disclosure;

FIGS. 4A-4B are block diagrams illustrating data flows of an exemplary system in accordance with some embodiments of the present disclosure;

FIGS. 5A-5C illustrate non-limiting example embodiments of the consolidated UI view and modified message view generated from extracted information from shared messages according to some embodiments of the present disclosure; and FIG. 6 is a block diagram illustrating a data flow of an exemplary system in accordance with some embodiments of the present disclosure.

DESCRIPTION OF EMBODIMENTS

Figure 1:
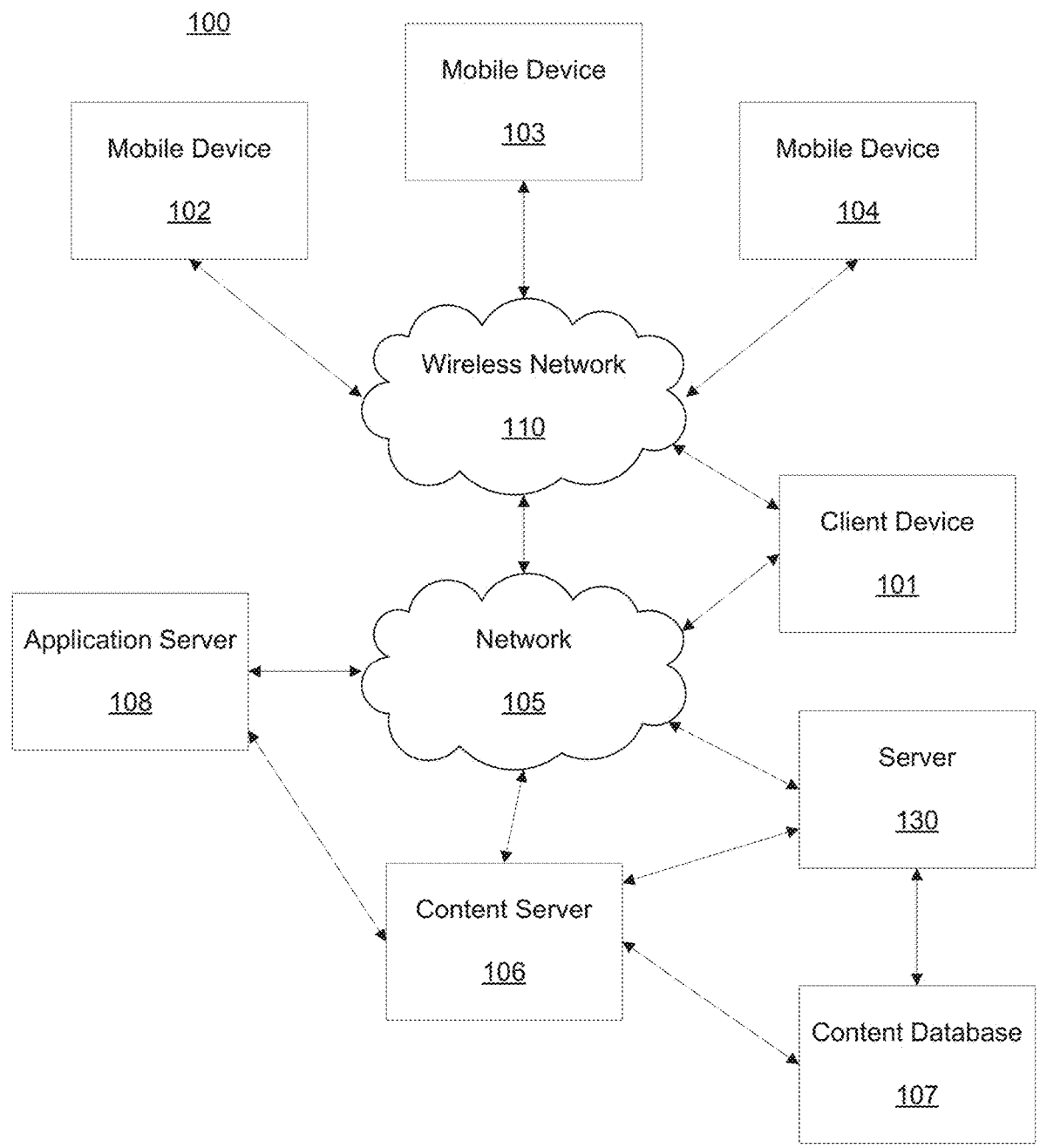
FIG. 1 is a schematic diagram illustrating an example of a network within which the systems and methods disclosed herein could be implemented according to some embodiments of the present disclosure.

The present disclosure will now be described more fully hereinafter with reference to the accompanying drawings, which form a part hereof, and which show, by way of non-limiting illustration, certain example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

The present disclosure is described below with reference to block diagrams and operational illustrations of methods and devices. It is understood that each block of the block diagrams or operational illustrations, and combinations of blocks in the block diagrams or operational illustrations, can be implemented by means of analog or digital hardware and computer program instructions. These computer program instructions can be provided to a processor of a general purpose computer to alter its function as detailed herein, a special purpose computer, ASIC, or other programmable data processing apparatus, such that the instructions, which execute via the processor of the computer or other programmable data processing apparatus, implement the functions/acts specified in the block diagrams or operational block or blocks. In some alternate implementations, the functions/acts noted in the blocks can occur out of the order noted in the operational illustrations. For example, two blocks shown in succession can in fact be executed substantially concurrently or the blocks can sometimes be executed in the reverse order, depending upon the functionality/acts involved.

For the purposes of this disclosure a non-transitory computer readable medium (or computer-readable storage medium/media) stores computer data, which data can include computer program code (or computer-executable instructions) that is executable by a computer, in machine readable form. By way of example, and not limitation, a computer readable medium may comprise computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer readable storage media includes, but is not limited to, RAM, ROM, EPROM, EEPROM, flash memory or other solid state memory technology, CD-ROM, DVD, or other optical storage, cloud storage, magnetic cassettes, magnetic tape, magnetic disk storage or other magnetic storage devices, or any other physical or material medium which can be used to tangibly store the desired information or data or instructions and which can be accessed by a computer or processor.

For the purposes of this disclosure the term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and application software that support the services provided by the server. Cloud servers are examples.

For the purposes of this disclosure a "network" should be understood to refer to a network that may couple devices so that communications may be exchanged, such as between a server and a client device or other types of devices, including between wireless devices coupled via a wireless network, for example. A network may also include mass storage, such as network attached storage (NAS), a storage area network (SAN), a content delivery network (CDN) or other forms of computer or machine readable media, for example. A network may include the Internet, one or more local area networks (LANs), one or more wide area networks (WANs), wire-line type connections, wireless type connections, cellular or any combination thereof. Likewise, sub-networks, which may employ differing architectures or may be compliant or compatible with differing protocols, may interoperate within a larger network.

For purposes of this disclosure, a "wireless network" should be understood to couple client devices with a network. A wireless network may employ stand-alone ad-hoc networks, mesh networks, Wireless LAN (WLAN) networks, cellular networks, or the like. A wireless network may further employ a plurality of network access technologies, including Wi-Fi, Long Term Evolution (LTE), WLAN, Wireless Router (WR) mesh, or 2nd, 3rd, $4^{th}$ or $5^{th}$ generation (2G, 3G, 4G or 5G) cellular technology, Bluetooth, 802.11b/g/n, or the like. Network access technologies may enable wide area coverage for devices, such as client devices with varying degrees of mobility, for example.

In short, a wireless network may include virtually any type of wireless communication mechanism by which signals may be communicated between devices, such as a client device or a computing device, between or within a network, or the like.

A computing device may be capable of sending or receiving signals, such as via a wired or wireless network, or may be capable of processing or storing signals, such as in memory as physical memory states, and may, therefore, operate as a server. Thus, devices capable of operating as a server may include, as examples, dedicated rack-mounted servers, desktop computers, laptop computers, set top boxes, integrated devices combining various features, such as two or more features of the foregoing devices, or the like.

For purposes of this disclosure, a client (or consumer or user) device may include a computing device capable of sending or receiving signals, such as via a wired or a wireless network. A client device may, for example, include a desktop computer or a portable device, such as a cellular telephone, a smart phone, a display pager, a radio frequency (RF) device, an infrared (IR) device an Near Field Communication (NFC) device, a Personal Digital Assistant (PDA), a handheld computer, a tablet computer, a phablet, a laptop computer, a set top box, a wearable computer, smart watch, an integrated or distributed device combining various features, such as features of the forgoing devices, or the like.

A client device may vary in terms of capabilities or features. Claimed subject matter is intended to cover a wide range of potential variations, such as a web-enabled client device or previously mentioned devices may include a high-resolution screen (HD or 4K for example), one or more physical or virtual keyboards, mass storage, one or more accelerometers, one or more gyroscopes, global positioning system (GPS) or other location-identifying type capability, or a display with a high degree of functionality, such as a touch-sensitive color 2D or 3D display, for example.

A client device may include or may execute a variety of possible applications, such as a client software application enabling communication with other devices. A client device may also include or execute an application to communicate content, such as, for example, textual content, multimedia content, or the like. A client device may also include or execute an application to perform a variety of possible tasks, such as messaging functionality, browsing, searching, playing, streaming or displaying various forms of content, including locally stored or uploaded messages, images and/or video, or games (such as live broadcasts of professional sporting events).

As discussed herein, reference to an "advertisement" should be understood to include, but not be limited to, digital media content embodied as a media item that provides information provided by another user, service, third party, entity, and the like. Such digital ad content can include any type of known or to be known media renderable by a computing device, including, but not limited to, video, text, audio, images, and/or any other type of known or to be known multi-media item or object. In some embodiments, the digital ad content can be formatted as hyperlinked multi-media content that provides deep-linking features and/or capabilities. Therefore, while some content is referred to as an advertisement, it is still a digital media item that is renderable by a computing device, and such digital media item comprises content relaying promotional content provided by a network associated party.

The principles described herein may be embodied in many different forms. The disclosed systems and methods provide advanced mechanisms for extracting information from textual portions of communications sent to/from users on a network, and displaying content related to the extracted information in a manner that enables users to act therefrom.

According to some embodiments, the disclosed systems and methods execute functionality for analyzing messages shared over a network (e.g., sent to and from a set of users) and identifying information in them referencing entities (i.e., entity information) based on a determined context of the messages. As discussed above, and in more detail below with reference to FIG. 4, once the entity information is identified, the disclosed framework is embodied with functionality for presenting the entity information within a contextual view UI.

Figure 5B:

By way of a non-limiting example, as illustrated in FIGS. 5A-5B, user Bob and Jim are discussing whether to attend the first hockey game of the year between the Boston Bruins® and the New York Rangers®. As depicted in FIG. 5A, Bob emails Jim and asks if he would like to go to the game by stating "Want to see the Bruins game at MSG?" Item 501a in FIG. 5A. Jim responds with an email that states "Agreed. Let's buy tickets for the Bruins game." Item 501b in FIG. 5A.

According to the disclosed systems and methods, as discussed in more detail below, the disclosed framework (embodied through the entity discovery engine 300) analyzes each of these messages (in real- or near real-time) in the background as they are shared, and identifies the entity information as "NY Rangers", "Boston Bruins" and "Madison Square Garden" (for MSG). This information indicates that two National Hockey League® (NHL) teams, the Rangers and Bruins, will be playing at MSG. In some embodiments, this information can be compiled into a search that will retrieve the information for the game. Then, the disclosed framework will generate a content card (also referred to as an information card) with the identified entity information and display it within a generated (or queried) map view of MSG. Thus, the content card 502 for the game will be displayed on a user interface (UI) display 500 of the map for MSG, as illustrated in FIG. 5B. This display can be provided to both Bob and Jim. As discussed herein, the display is pivotable, such that the display may not immediately be displayed on Bob's and Jim's devices; rather, in some embodiments, a messaging notification can be sent to Bob and Jim (e.g., within their email inbox or window or other messaging application) in a manner that enables them to toggle between the view they are currently viewing on their device and the view depicted in FIG. 5B. The toggling can be a result of separate windows, tabbed windows or embedded window functionality that displays related UI portions based on an input indicating which portion the user desires to view. Depending on available screen real estate, the windows can be viewed simultaneously, if for example the user is employing a tablet or laptop rather than a smart phone with limited screen real estate.

Further, the content card 502 in FIG. 5B can include a deep-linking feature that enables Bob and Jim to perform a search for more information about the event (e.g., perform a search for tickets). As an example of this feature, card 502 includes this feature embodied as the hyperlinked text "Ticketmaster for tickets" which, upon clicking, would take Bob and Jim to the Ticketmaster® site where they can search for and purchase tickets for that specific game.

Thus, implementation of the disclosed systems and methods in connection with existing messaging systems provides them with increased, previously non-existent, functionality for presenting users with vital information derived from plain text within their message activity. Users will no longer need to parse through the entire message chain to search for such information. The presentation of information resultant from the disclosed systems and methods operates in the background of messages, and enables users to seamlessly switch, pivot or toggle between display screens while all the relevant information is automatically provided at "their fingertips." In addition, according to some embodiments, the information identified and extracted from messages can be indexed and a search service can directly list such entities in the results with a link to the message thread, should the user want to read through the chain.

As discussed in more detail below at least in relation to FIG. 6, according to some embodiments, information associated with, derived from, or otherwise identified from, during or as a result of the entity discovery, extraction and/or identification, as discussed herein, can be used for monetization purposes and targeted advertising when providing, delivering or enabling such devices access to content or services over a network. Providing targeted advertising to users associated with such discovered content can lead to an increased click-through rate (CTR) of such ads and/or an increase in the advertiser's return on investment (ROI) for serving such content provided by third parties (e.g., digital advertisement content provided by an advertiser, where the advertiser can be a third party advertiser, or an entity directly associated with or hosting the systems and methods discussed herein).

Certain embodiments will now be described in greater detail with reference to the figures. In general, with reference to FIG. 1, a system 100 in accordance with an embodiment of the present disclosure is shown. FIG. 1 shows components of a general environment in which the systems and methods discussed herein may be practiced. Not all the components may be required to practice the disclosure, and variations in the arrangement and type of the components may be made without departing from the spirit or scope of the disclosure. As shown, system 100 of FIG. 1 includes local area networks ("LANs")/wide area networks ("WANs")—network 105, wireless network 110, mobile devices (client devices) 102-104 and client device 101. FIG. 1 additionally includes a variety of servers, such as content server 106, application (or "App") server 108 and third party server 130.

One embodiment of mobile devices 102-104 may include virtually any portable computing device capable of receiving and sending a message over a network, such as network 105, wireless network 110, or the like. Mobile devices 102-104 may also be described generally as client devices that are configured to be portable. Thus, mobile devices 102-104 may include virtually any portable computing device capable of connecting to another computing device and receiving information, as discussed above. As such, mobile devices 102-104 typically range widely in terms of capabilities and features.

Mobile devices 102-104 also may include at least one client application that is configured to receive content from another computing device. In some embodiments, mobile devices 102-104 may also communicate with non-mobile client devices, such as client device 101, or the like. In one embodiment, such communications may include sending and/or receiving messages, searching for, viewing and/or sharing photographs, digital images, audio clips, video clips, or any of a variety of other forms of communications.

Client devices 101-104 may be capable of sending or receiving signals, such as via a wired or wireless network, or may be capable of processing or storing signals, such as in memory as physical memory states, and may, therefore, operate as a server.

Wireless network 110 is configured to couple mobile devices 102-104 and its components with network 105. Wireless network 110 may include any of a variety of wireless sub-networks that may further overlay stand-alone ad-hoc networks, and the like, to provide an infrastructure-oriented connection for mobile devices 102-104.

Network 105 is configured to couple content server 106, application server 108, or the like, with other computing devices, including, client device 101, and through wireless network 110 to mobile devices 102-104. Network 105 is enabled to employ any form of computer readable media or network for communicating information from one electronic device to another.

The content server 106 may include a device that includes a configuration to provide any type or form of content via a network to another device. Devices that may operate as content server 106 include personal computers desktop computers, multiprocessor systems, microprocessor-based or programmable consumer electronics, network PCs, servers, and the like. Content server 106 can further provide a variety of services that include, but are not limited to, email services, instant messaging (IM) services, streaming and/or downloading media services, search services, photo services, web services, social networking services, news services, third-party services, audio services, video services, SMS services, MMS services, FTP services, voice over IP (VOIP) services, or the like.

Third party server 130 can comprise a server that stores online advertisements for presentation to users. "Ad serving" refers to methods used to place online advertisements on websites, in applications, or other places where users are more likely to see them, such as during an online session or during computing platform use, for example. Various monetization techniques or models may be used in connection with sponsored advertising, including advertising associated with user data. Such sponsored advertising includes monetization techniques including sponsored search advertising, non-sponsored search advertising, guaranteed and non-guaranteed delivery advertising, ad networks/exchanges, ad targeting, ad serving and ad analytics. Such systems can incorporate near instantaneous auctions of ad placement opportunities during web page creation, (in some cases in less than 500 milliseconds) with higher quality ad placement opportunities resulting in higher revenues per ad. That is advertisers will pay higher advertising rates when they believe their ads are being placed in or along with highly relevant content that is being presented to users. Reductions in the time needed to quantify a high quality ad placement offers ad platforms competitive advantages. Thus, higher speeds and more relevant context detection improve these technological fields.

For example, a process of buying or selling online advertisements may involve a number of different entities, including advertisers, publishers, agencies, networks, or developers. To simplify this process, organization systems called "ad exchanges" may associate advertisers or publishers, such as via a platform to facilitate buying or selling of online advertisement inventory from multiple ad networks. "Ad networks" refers to aggregation of ad space supply from publishers, such as for provision en-masse to advertisers. For web portals like Yahoo! ®, advertisements may be displayed on web pages or in apps resulting from a user-defined search based at least in part upon one or more search terms. Advertising may be beneficial to users, advertisers or web portals if displayed advertisements are relevant to interests of one or more users. Thus, a variety of techniques have been developed to infer user interest, user intent or to subsequently target relevant advertising to users. One approach to presenting targeted advertisements includes employing demographic characteristics (e.g., age, income, gender, occupation, and the like) for predicting user behavior, such as by group. Advertisements may be presented to users in a targeted audience based at least in part upon predicted user behavior(s).

Another approach includes profile-type ad targeting. In this approach, user profiles specific to a user may be generated to model user behavior, for example, by tracking a user's path through a web site or network of sites, and compiling a profile based at least in part on pages or advertisements ultimately delivered. A correlation may be identified, such as for user purchases, for example. An identified correlation may be used to target potential purchasers by targeting content or advertisements to particular users. During presentation of advertisements, a presentation system may collect descriptive content about types of advertisements presented to users. A broad range of descriptive content may be gathered, including content specific to an advertising presentation system. Advertising analytics gathered may be transmitted to locations remote to an advertising presentation system for storage or for further evaluation. Where advertising analytics transmittal is not immediately available, gathered advertising analytics may be stored by an advertising presentation system until transmittal of those advertising analytics becomes available.

In some embodiments, users are able to access services provided by servers 106, 108 and/or 130. This may include in a non-limiting example, authentication servers, search servers, email servers, social networking services servers, SMS servers, IM servers, MMS servers, exchange servers, photo-sharing services servers, and travel services servers, via the network 105 using their various devices 101-104.

In some embodiments, applications, such as a mail application (e.g., Yahoo! Mail®, Gmail®, and the like), instant messaging application, blog, photo or social networking application (e.g., Facebook®, Twitter® and the like), search application (e.g., Yahoo!® Search), and the like, can be hosted by the application server 108 (or content server 106 and the like).

Thus, the application server 108, for example, can store various types of applications and application related information including application data and user profile information (e.g., identifying and behavioral information associated with a user). It should also be understood that content server 106 can also store various types of data related to the content and services provided by content server 106 in an associated content database 107, as discussed in more detail below. Embodiments exist where the network 105 is also coupled with/connected to a Trusted Search Server (TSS) which can be utilized to render content in accordance with the embodiments discussed herein. Embodiments exist where the TSS functionality can be embodied within servers 106, 108 and/or 130.

Moreover, although FIG. 1 illustrates servers 106, 108 and 130 as single computing devices, respectively, the disclosure is not so limited. For example, one or more functions of servers 106, 108 and/or 130 may be distributed across one or more distinct computing devices. Moreover, in one embodiment, servers 106, 108 and/or 130 may be integrated into a single computing device, without departing from the scope of the present disclosure.

FIG. 2 is a schematic diagram illustrating a client device showing an example embodiment of a client device that may be used within the present disclosure. Client device 200 may include many more or less components than those shown in FIG. 2. However, the components shown are sufficient to disclose an illustrative embodiment for implementing the present disclosure. Client device 200 may represent, for example, client devices discussed above in relation to FIG. 1.

As shown in the figure, Client device 200 includes a processing unit (CPU) 222 in communication with a mass memory 230 via a bus 224. Client device 200 also includes a power supply 226, one or more network interfaces 250, an audio interface 252, a display 254, a keypad 256, an illuminator 258, an input/output interface 260, a haptic interface 262, an optional global positioning systems (GPS) receiver 264 and a camera(s) or other optical, thermal or electromagnetic sensors 266. Device 200 can include one camera/sensor 266, or a plurality of cameras/sensors 266, as understood by those of skill in the art. The positioning of the camera(s)/sensor(s) 266 on device 200 can change per device 200 model, per device 200 capabilities, and the like, or some combination thereof. Power supply 226 provides power to Client device 200.

Client device 200 may optionally communicate with a base station (not shown), or directly with another computing device. Network interface 250 is sometimes known as a transceiver, transceiving device, or network interface card (NIC).

Audio interface 252 is arranged to produce and receive audio signals such as the sound of a human voice. For example, audio interface 252 may be coupled to a speaker and microphone (not shown) to enable telecommunication with others and/or generate an audio acknowledgement for some action. Display 254 may be a liquid crystal display (LCD), gas plasma, light emitting diode (LED), or any other type of display used with a computing device. Display 254 may also include a touch sensitive screen arranged to receive input from an object such as a stylus or a digit from a human hand.

Keypad 256 may comprise any input device arranged to receive input from a user. Illuminator 258 may provide a status indication and/or provide light.

Client device 200 also comprises input/output interface 260 for communicating with external. Input/output interface 260 can utilize one or more communication technologies, such as USB, infrared, Bluetooth™, or the like. Haptic interface 262 is arranged to provide tactile feedback to a user of the client device.

Optional GPS transceiver 264 can determine the physical coordinates of Client device 200 on the surface of the Earth, which typically outputs a location as latitude and longitude values. GPS transceiver 264 can also employ other geo-positioning mechanisms, including, but not limited to, triangulation, assisted GPS (AGPS), E-OTD, CI, SAI, ETA, BSS or the like, to further determine the physical location of Client device 200 on the surface of the Earth. In one embodiment, however, Client device may through other components, provide other information that may be employed to determine a physical location of the device, including for example, a MAC address, Internet Protocol (IP) address, or the like.

Mass memory 230 includes a RAM 232, a ROM 234, and other storage means. Mass memory 230 illustrates another example of computer storage media for storage of information such as computer readable instructions, data structures, program modules or other data. Mass memory 230 stores a basic input/output system ("BIOS") 240 for controlling low-level operation of Client device 200. The mass memory also stores an operating system 241 for controlling the operation of Client device 200

Memory 230 further includes one or more data stores, which can be utilized by Client device 200 to store, among other things, applications 242 and/or other information or data. For example, data stores may be employed to store information that describes various capabilities of Client device 200. The information may then be provided to another device based on any of a variety of events, including being sent as part of a header (e.g., index file of the HLS stream) during a communication, sent upon request, or the like. At least a portion of the capability information may also be stored on a disk drive or other storage medium (not shown) within Client device 200.

Applications 242 may include computer executable instructions which, when executed by Client device 200, transmit, receive, and/or otherwise process audio, video, images, and enable telecommunication with a server and/or another user of another client device. Applications 242 may further include search client 245 that is configured to send, to receive, and/or to otherwise process a search query and/or search result.

Having described the components of the general architecture employed within the disclosed systems and methods, the components' general operation with respect to the disclosed systems and methods will now be described below with reference to FIGS. 3-6.

FIG. 3 is a block diagram illustrating the components for performing the systems and methods discussed herein. FIG. 3 includes entity discovery engine 300, network 315 and database 320. The entity discovery engine 300 can be a special purpose machine or processor and could be hosted by an application server, content server, social networking server, web server, email server, search server, content provider, third party server, user's computing device, and the like, or any combination thereof.

According to some embodiments, entity discovery engine 300 can be embodied as a stand-alone application that executes on a user device. In some embodiments, the entity discovery engine 300 can function as an application installed on the user's device, and in some embodiments, such application can be a web-based application accessed by the user device over a network. In some embodiments, the entity discovery engine 300 can be installed as an augmenting script, program or application (e.g., a plug-in or extension) to another application (e.g., Yahoo! Mail®).

The database 320 can be any type of database or memory, and can be associated with a content server on a network (e.g., content server, a search server or application server) or a user's device (e.g., device 101-104 or device 200 from FIGS. 1-2). Database 320 comprises a dataset of data and metadata associated with local and/or network information related to users, services, applications, content and the like. Such information can be stored and indexed in the database 320 independently and/or as a linked or associated dataset. As discussed above, it should be understood that the data (and metadata) in the database 320 can be any type of information and type, whether known or to be known, without departing from the scope of the present disclosure.

According to some embodiments, database 320 can store data for users, e.g., user data. According to some embodiments, the stored user data can include, but is not limited to, information associated with a user's profile, user interests, user behavioral information, user attributes, user preferences or settings, user demographic information, user location information, user biographic information, and the like, or some combination thereof. In some embodiments, the user data can also include user device information, including, but not limited to, device identifying information, device capability information, voice/data carrier information, Internet Protocol (IP) address, applications installed or capable of being installed or executed on such device, and/or any, or some combination thereof. It should be understood that the data (and metadata) in the database 320 can be any type of information related to a user, content, a device, an application, a service provider, a content provider, whether known or to be known, without departing from the scope of the present disclosure.

According to some embodiments, database 320 can store data and metadata associated with a user from an assortment of media and/or service providers and/or platforms. For example, the information can be related to, but not limited to, content type or category, information associated with the sender or recipient(s) of a message, information associated with content or text included in a message, and any other type of known or to be known attribute or feature associated with a message or content of a message, or some combination thereof.

According to some embodiments, information related to, derived from or otherwise determined from analysis of messages addressed to and/or hosted within a user's inbox can be stored in database 320 as n-dimensional vector (or feature vector), where the information associated with each message can be translated as a node on the n-dimensional vector for an inbox. In some embodiments, each message can have its own vector where the information included therein can be represented by the nodes on a respective vector. In some embodiments, as messages are sent/received, detected and/or tracked, information corresponding thereto can also be stored in the database 320 in a similar manner.

Database 320 can store and index inbox/message information in database 320 as linked set of inbox/message data and metadata, where the data and metadata relationship can be stored as the n-dimensional vector. Such storage can be realized through any known or to be known vector or array storage, including but not limited to, a hash tree, queue, stack, VList, or any other type of known or to be known dynamic memory allocation technique or technology. It should be understood that any known or to be known computational analysis technique or algorithm, such as, but not limited to, cluster analysis, data mining, Bayesian network analysis, Hidden Markov models, artificial neural network analysis, logical model and/or tree analysis, and the like, and be applied to determine, derive or otherwise identify vector information for messages within an inbox.

For purposes of the present disclosure, as discussed above, messages (which are stored and located in database 320) as a whole are discussed within some embodiments; however, it should not be construed to limit the applications of the systems and methods discussed herein. That is, while reference is made throughout the instant disclosure to messages (e.g., email messages or other forms of messages that include or are made up of plain text), other forms of messages (e.g., social media messages, Instant Messages (IMs)) and other mediums that display textual information in whole or in part (e.g., a map), and the content included therein, including, audio, images, multimedia, RSS feed information, can be used without departing from the scope of the instant application, which can thereby be communicated and/or accessed and processed by the entity discovery engine 300 according to the systems and methods discussed herein.

As discussed above, with reference to FIG. 1, the network 315 can be any type of network such as, but not limited to, a wireless network, a local area network (LAN), wide area network (WAN), the Internet, or a combination thereof. The network 315 facilitates connectivity of the entity discovery engine 300, and the database of stored resources 320. Indeed, as illustrated in FIG. 3, the entity discovery engine 300 and database 320 can be directly connected by any known or to be known method of connecting and/or enabling communication between such devices and resources.

The principal processor, server, or combination of devices that comprises hardware programmed in accordance with the special purpose functions herein is referred to for convenience as entity discovery engine 300, and includes message module 302, entity module 304, matching module 306 and display module 308. It should be understood that the engine(s) and modules discussed herein are non-exhaustive, as additional or fewer engines and/or modules (or sub-modules) may be applicable to the embodiments of the systems and methods discussed. The operations, configurations and functionalities of each module, and their role within embodiments of the present disclosure will be discussed below.

Turning to FIGS. 4A-4B, Processes 400 and 450 provide data flows that detail embodiments of the disclosed framework for analyzing messages shared over a network (e.g., messages that have been sent, received, and/or are being sent and/or received), and identifying information in them that references entities based on a determined context of the messages. Process 400 of FIG. 4A discusses an embodiment where once the entity information is identified, the disclosed framework segregates them based on the context, and then presents them in contextual views as content cards within or as part of generated, content-specific interfaces. Process 450 of FIG. 4B discusses an embodiment where the message is modified based on discovered information related to the entity information.

According to some embodiments of Process 400 of FIG. 4A, Steps 402-404 of Process 400 are performed by the message module 302 of the entity discovery engine 300; Steps 406-408 are performed by the entity module 304; Step 410 is performed by the matching module 306; and Steps 412-418 are performed by the display module 308.

Process 400 of FIG. 4A begins with Step 402 where a message, or set of messages, are identified. According to some embodiments, the identified message(s) is an incoming message sent by a sender that is directed to and received at a recipient's inbox. In some embodiments, the steps of Process 400 can be performed for each incoming message received in a recipient's inbox.

In some embodiments, the set of messages analyzed by Process 400 can be a set of messages identified from a user's inbox. The identification of the messages can be based on a criteria such that only a set of all the messages in the inbox are identified. Such criteria can reference a type of message (e.g., personal or commercial messages), a time period, location associated with a message(s) (e.g., where was the message sent from, what location does the message reference, where was the message received, and the like), an identity of a sender, other recipients of a message (e.g., if it was a group message), which platform the message originated from (e.g., was it a message from another messaging platform), is the message unread, was the message acted upon (e.g., was it forwarded, responded to, saved, categorized or deleted), how was the message checked/read (e.g., did the user open and read the message from an application on his/her mobile device), how often or recent (compared to a threshold) did the user contact or receive correspondence from the sender/recipient, and the like, or some combination thereof.

Therefore, according to some embodiments, Step 402 involves analyzing received or incoming messages according to the criteria and identifying a message set (e.g., a single message or a plurality of messages) that satisfy the criteria. This enables engine 300 to efficiently analyze and process a smaller set of messages, as those messages not satisfying the criteria are filtered out, which alleviates the system from having to perform unnecessary analysis of certain types of messages (e.g., spam messages received during a same time a message thread with a person's friends is occurring).

For example, Step 402 can involve determining a set of messages that are sent by a user's friends entities (i.e., are the senders included in the user's contact list). For example, a user receives 100 emails a day—therefore, according to Step 402, engine 300 can identify a subset of those emails that are from his/her contacts, thereby filtering out those messages that are from commercial senders. According to some embodiments, Step 402 can involve parsing the inbox data of the user's inbox and identify each message in the set therein (e.g., based on the criteria).

In Step 404, the identified message is analyzed in order to determine a context (e.g., or a topic) of the message. For example, if the message sent by a sender includes information (e.g., text) about a potential restaurant reservation for later in the week, Step 404 involves analyzing the information (e.g., the text) and, based on such analysis, determining that the context of the message relates to a "future dinner reservation".

According to some embodiments, the analysis and determination performed in Step 404 can be based on analysis of the data and/or metadata of the message. For example, the message may include metadata that includes a category field indicating date and restaurant information.

According to some embodiments, engine 300 can identify the context of the message based on language content in the message. In some embodiments, this can be focused on the plain text of the message, and in some embodiments, this can alternatively or additionally involve the text within multimedia portions of the message. In some embodiments, engine 300 may analyze the language content by executing software defined by a natural language processing (NLP) algorithm. An NLP algorithm, in one embodiment, can use probabilistic methods to identify one or more topics from the language content of the message. In some embodiments, engine 300 may search for keywords within the language content, the keywords being associated with particular topics. Thus, in some embodiments, Engine 300 can identify a topic based on keywords found within the language content of the reply message.

In some embodiments, engine 300 can identify the context of the message based on a syntactic analysis or a sematic analysis of the language content of the message. The syntactic analysis may involve parsing the message into discrete components, such as clause or phrases, where each component has a central idea (e.g., a keyword). The semantic analysis may involve identifying the central idea of each discrete component identified through the syntactic analysis.

In some embodiments, the analysis of the messages by the engine 300 can involve the engine 300 implementing a parser on the backend in order to analyze the text of the message. The parser is responsible for extracting any relevant content from the message using natural language processing techniques, from which the context and entity information, as discussed below, can be determined, derived or otherwise identified.

In Step 406, the identified message is then further analyzed based on the determined context in order to identify entity information included therein. As discussed above, the entity information refers to any type of information textually included within a message that is determined to be of importance to the user (and to the message's purpose). For example, entity information can include phone numbers, email addresses, physical, addresses (zip codes, street names and numbers, cities, states, GPS coordinates, and the like), names (of people, restaurants, businesses, locations, events and the like), calendar events, website names, domain names, uniform resource locators (URLs), and the like.

Thus, when analyzing the text (or language components) of the message, engine 300 is searching for a set (or string) of characters that corresponds to the context. For example, using the above example, if the context is a "future dinner reservation", then analysis of the message would yield the date of the reservation, a time of the reservation and a location (or restaurant name) of the reservation.

The analysis of the message involves parsing the data and metadata of the message in a similar manner as discussed above in relation to Step 402. In some embodiments, the analysis of the message occurring in Step 406 (and/or Step 404) can involve engine 300 engine 300 executing software defined by a regular expression (regex) algorithm on the identified message. The regex algorithm can be any type of known or to be known algorithm that identifies a sequence of characters, pattern of characters, a target of characters, and the like, such as a string searching algorithm. As a result of the regex software execution, Step 406 can involve identifying the specific text within the message that corresponds to the determined context (and in Step 404, regex analysis can result in the identification of terms that provide for the determined context).

In Step 408, the identified entity information from the message is extracted. According to some embodiments, such extraction can involve any type of known or to be known information extraction (IE) or information retrieval (IR) process, algorithm or mechanism that automatically extracts structured information from unstructured, structured or semi-structed machine-readable documents (e.g., messages). For example, engine 300 can execute software defined by an artificial intelligence (AI), NLP, scraping, mining or searching algorithm for performing such entity recognition and knowledge/term extraction.

In Step 410, a query is generated based on the extracted entity information, and is utilized to search for information related to those identified entities. According to some embodiments, the search can be over a network, for example, the Internet; and in some embodiments, the search can be additionally or alternatively focused on a local device's storage (e.g., a user's local drive or their personal cloud storage). For example, if the entity information indicates a restaurant's name, then the searched query can involve searching the Internet for information identifying the restaurant and information related thereto—for example, the restaurant's URL, menu, gallery of the seating areas and kitchen, address, phone number and the like.

According to some embodiments, the search is based on the engine 300 leveraging the generated query to perform fuzzy matching. In such embodiments, fuzzy matching is used because portions of the entity information may not 100% accurately reference particular entities (e.g., a restaurant's name may be misspelled); therefore, fuzzy matching performs the computer-assisted identification of terms in a query (e.g., text entries relating to words, phrases and/or sentences or sentence-level fragments) to specific local and/or network resources by performing record linkage (RL) processing, which is the computerized task of finding records in a data set that refer to the same entity across different data sources (e.g., data files, books, websites, and databases). Record linkage can be used to search for or join data sets based on entities that may or may not share a common identifier (e.g., database key, URI, National identification number), which may be due to differences in record shape, storage location, or curator style or preference.

Thus, the result of Step 410 involves the identification of additional, augmenting or original information related to entities referenced in the message by the identified entity information.

In Step 412, as a result of Step 410, a content card (also referred to as an electronic content card or "content card") can be generated for the message. In some embodiments, a content card can be generated for the message as a whole; and in some embodiments, a content card can be generated for each instance of entity information identified within the message.

For example, if the message included text referencing seeing a concert after having dinner at a restaurant, then, in some embodiments, two (2) content cards can be generated: 1) a content card including information about the concert discovered from the performance of Step 410, and 2) a content card including information about the restaurant discovered from the performance of Step 410.

As understood by those of skill in the art, a digital or electronic "content card" (also referred to as a "information card" or "card", interchangeably) is a digital, displayable information object that can be personalized and/or generated based on device information, source information and/or user information. Content cards are individual pieces of content aggregated together for display on a device (e.g., the information discovered from the search in Step 410 is aggregated for population within a generated card). Displayed content cards on a single display can be from different network sources, and can have different sizes depending on the relevancy to a search and/or available space on a device's display screen. Cards can display any type of digital content, and can be formatted as hyperlinked multi-media content that provides deep-linking features and/or capabilities.

In Step 414, a type of entity the entity information represents is determined. Such determination can be based on the context of the message (from Step 404) or based on further analysis of the message, entity information and/or the search results from Step 410. Such analysis can be performed in a similar manner as discussed above in relation to Steps 404-406. The type of entity forms the basis for a type of user interface (UI) that is needed, desired and/or required to display the generated content card.

For example, if the entity being referenced is a phone number, then the type would indicate it is "contact information" and the display of the content card can be associated with an address book. In another example, if the entity is a hiking trail, then the type would be a "geographic location" and the display of the content card can be associated with a map.

Therefore, as a result of Step 414, Step 416 is performed which generates a UI based on the determined type of entity. According to some embodiments, in addition or alternatively to the type of entity the entity information is referencing, the UI can be based on additional information including, but not limited to, a type of device being used to communicate the message (e.g., table, laptop, smartphone, wearable device, and the like), screen size of the device, display a capabilities of the device, and the like, or some combination thereof, And, in Step 418, the card and UI are caused to be displayed to the user on a device of the user. As discussed above, the display of card and UI can be a toggled view, tabbed view, embedded and/or separate view to that of the messaging application the user is using to communicate the message(s).

By way of a non-limiting example, as discussed above and illustrated in FIG. 5B, the information collected from the search from Step 410 is used to populate the generated content card 502. In this example, the entity information referenced a hockey game at MSG. The card 502 was generated and populated with information related to which teams were playing, when they were playing, where the game was, and a networked means for obtaining tickets. The UI 500 provided a mapped view that relayed where the game was (i.e., where MSG was located). In some embodiments, the UI can provide further information, such as, but not limited to, traffic information, driving directions from a user(s) location (e.g., their home address, work address or current address), or suggested other locations to visit around the identified location. Display of card 502 can involve overlaying UI 500 within the same window, embedding within UI 500 or populating in a separate window view that obscures a part of the UI 500.

In another non-limiting example, if Jim and Bob are discussing where to eat in San Francisco, CA—the resultant UI generated and displayed on their devices can be, for example, a map of San Francisco, CA, where displayed content cards are situated where a set of restaurants are located on the map, and the cards provide restaurant information (e.g., name, menu, open and close times, phone number for reservations, and the like).

In yet another non-limiting example, if Jim and Bob are texting with each other discussing what time to eat at a specific restaurant, they can be provided with a UI that includes a content card or information related to the menu at that specific restaurant.

In another non-limiting example, the UI generated can be also be based on the type of device a user is using. For example, if Jim and Bob are sharing contact information with each other (e.g., phone numbers), and Jim is using a smartphone and Bob is using his laptop to communicate with each other—then, the UI displayed on Jim's device could be the window interface associated with the "contacts" program on his phone, and the UI displayed on Bob's device could be a mail app, so that Bob can enter/save the number in his contacts.

Turning to Process 450 in FIG. 4B, according to some embodiments, Steps 402-404 of Process 450 are performed by the message module 302 of the entity discovery engine 300; Steps 406-408 are performed by the entity module 304; Step 410 is performed by the matching module 306; and Steps 420-424 are performed by the display module 308.

According to some embodiments, after Step 410 is performed, engine 300 can turn to Step 420 where the message can be automatically modified based on the result of the search. Such automatic modification can occur prior to the message's delivery. That is, in some embodiments, the message identified in Step 402 is analyzed upon a server receiving it from a sender device, yet prior to delivering it to the recipient user. Prior to such delivery, the message can be modified to include the additional information identified from Step 410, or a pointer or reference thereto, and can then be sent to the recipient so that the recipient receives the modified message, which includes an indicator as to where the message was modified (which indicates that additional information is readily available or retrievable). In some embodiments, the entire format of the message can be modified, and in some embodiments, only the specific portion of the message related to the entity information can be modified.

For example, if a message states "Agreed. Let's buy tickets for the Bruins game." (Using the example from FIGS. 5A-5B, discussed above). The message (item 501b) can be modified to indicate that the message has been augmented to include a hyperlink to a network location to purchase the tickets. For example, the term "tickets" can be altered to a hyperlink that references a Ticketmaster® location to purchase the tickets—for example, "Agreed. Let's buy tickets for the Bruins game." (Where the italicized, underlined "tickets" is an example of a hyperlinked term).

The modifications to the text of the message, therefore, provides a different styling from the original text to show that it is an entity that is clickable, and pivotable to another UI, or in some embodiments, to performing another search (similar to a search from Step 410).

In another non-limiting example embodiment, according to some embodiments, after identifying the various entities that are present (or represented in text form in a message), the text can be modified with different types of identifiers, including, for example, but not limited to, emojis, animojis, avatars, GIFs, or any other type of digital object that can represent text and/or provide linking features to resources on a network or memory.

For example, message 501a from FIG. 5A can be modified to include icons that represent certain portions of text. The modified message 501c is illustrated in FIG. 5C, where a small sports icon related to "hockey" is inserted next to the "Bruins" text, which can be a link to the results of latest games, a location icon (e.g., a "dropped pin") can be inserted next to the text for "MSG" that points to the location on map (see FIG. 5B), and the "?" can be followed by a "ticket icon" linking to a site for purchasing tickets.

In Step 422, input can be received with corresponds to the modified portion of the message. Such input can be any type of user or computer-generated selection of clickable or selectable text within a communication comprising text. And, in Step 424, additional information related to the selected text is retrieved and displayed in a content card and/or UI, in a similar manner as discussed above in relation to Step 418 (and in FIG. 5B).

FIG. 6 is a work flow example 600 for serving related digital media content based on the information associated with an extracted entity content item, as discussed above in relation to FIGS. 3-5C. In some embodiments, the content can be associated with or comprising advertisements (e.g., digital advertisement content). Such content, referred to as "entity information" for reference purposes only, can include or be based upon, but is not limited to, information associated with an object a user sent from and/or received in his/her mailbox (e.g., a message or piece of text or media included within a message, for example), a context of a user's activity on a network and the like (e.g., how did the user interact with a message or extracted entity information, and/or some combination thereof).

As discussed above, reference to an "advertisement" should be understood to include, but not be limited to, digital media content that provides information provided by another user, service, third party, entity, and the like. Such digital ad content can include any type of known or to be known media renderable by a computing device, including, but not limited to, video, text, audio, images, and/or any other type of known or to be known multi-media. In some embodiments, the digital ad content can be formatted as hyperlinked multi-media content that provides deep-linking features and/or capabilities. Therefore, while the content is referred as an advertisement, it is still a digital media item that is renderable by a computing device, and such digital media item comprises digital content relaying promotional content provided by a network associated third party.

In Step 602, entity information is identified. As discussed above, the entity information can be based any of the information utilized or generated from/during the contextual determination, entity identification, entity extraction, searching or consolidated view generation outlined above with respect to FIGS. 4A-4B. For purposes of this disclosure, Process 600 will refer to single instance of entity extraction and view generation for serving additional content; however, it should not be construed as limiting, as any number of items, messages and/or views, as well as programs used can form such basis, without departing from the scope of the instant disclosure.

In Step 604, a context is determined based on the identified entity information. This context forms a basis for serving content related to the entity information. In some embodiments, the context can be in accordance with whether a user interacted with the entity information included in a content card, as discussed above in relation to FIGS. 3-5. For example, as discussed in relation to FIG. 5, a user is discussing attending a NHL® hockey game with a friend; therefore, the context identified in Step 604 can be related to "sports" or "hockey", more specifically, "NY Rangers" or "Boston Bruins", and can be leveraged in order to identify digital content related to such activity—e.g., a coupon for purchasing a ticket for the game at Madison Square Garden (MSG). In some embodiments, the identification of the context from Step 604 can occur before, during and/or after the analysis detailed above with respect to Process 400, or it can be a separate process altogether, or some combination thereof.

In Step 606, the determined context is communicated (or shared) with a content providing platform comprising a server and database (e.g., content server 106 and content database 107, and/or advertisement server 130 and ad database). Upon receipt of the context, the server performs (e.g., is caused to perform as per instructions received from the device executing the visual recognizer engine 300) a search for a relevant digital content within the associated database. The search for the content is based at least on the identified context.

In Step 608, the server searches the database for a digital content item(s) that matches the identified context. In Step 610, a content item is selected (or retrieved) based on the results of Step 608. In some embodiments, the selected content item can be modified to conform to attributes or capabilities of the page, interface, message, platform, application or method upon which the content item will be displayed, and/or to the application and/or device for which it will be displayed. In some embodiments, the selected content item is shared or communicated via the application the user is utilizing to view, render and/or interact with a message, text, media, content or object item. Step 612. In some embodiments, the selected content item is sent directly to a user computing device for display on the device and/or within the UI displayed on the device's display (e.g., the inbox or the consolidated view window). In some embodiments, the selected content item is displayed within a portion of the interface or within an overlaying or pop-up interface associated with a rendering interface displayed on the device. In some embodiments, the selected content item can be displayed as part of a coupon/ad clipping, coupon/ad recommendation and/or coupon/ad summarization interface.

For the purposes of this disclosure a module is a software, hardware, or firmware (or combinations thereof) system, process or functionality, or component thereof, that performs or facilitates the processes, features, and/or functions described herein (with or without human interaction or augmentation). A module can include sub-modules. Software components of a module may be stored on a computer readable medium for execution by a processor. Modules may be integral to one or more servers, or be loaded and executed by one or more servers. One or more modules may be grouped into an engine or an application.

For the purposes of this disclosure the term "user", "subscriber" "consumer" or "customer" should be understood to refer to a user of an application or applications as described herein and/or a consumer of data supplied by a data provider. By way of example, and not limitation, the term "user" or "subscriber" can refer to a person who receives data provided by the data or service provider over the Internet in a browser session, or can refer to an automated software application which receives the data and stores or processes the data.

Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the client level or server level or both. In this regard, any number of the features of the different embodiments described herein may be combined into single or multiple embodiments, and alternate embodiments having fewer than, or more than, all of the features described herein are possible.

Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

Furthermore, the embodiments of methods presented and described as flowcharts in this disclosure are provided by way of example in order to provide a more complete understanding of the technology. The disclosed methods are not limited to the operations and logical flow presented herein. Alternative embodiments are contemplated in which the order of the various operations is altered and in which sub-operations described as being part of a larger operation are performed independently.

While various embodiments have been described for purposes of this disclosure, such embodiments should not be deemed to limit the teaching of this disclosure to those embodiments. Various changes and modifications may be made to the elements and operations described above to obtain a result that remains within the scope of the systems and processes described in this disclosure.

What is claimed is:

1. A method comprising:
 receiving, by a first device over a network, a message addressed to a first user from a second user, the message at least comprising text within a body of the message provided by the second user;
 causing display, by the first device, of the message within a first portion of a user interface (UI), the first portion of the UI displayed on a display of a second device of the first user, the UI comprising functionality for toggling between the first portion and other portions of the UI;
 analyzing, by the first device, the body of the message, and based on said analysis, identifying entity information from the text within the body, the entity information comprising content referencing an entity;
 identifying, by the first device, digital content related to the entity information, the digital content comprises interactive content that enables navigation to a third party website that provides content related to a context of the message;

automatically modifying, by the first device, the display of the message within the first portion of the UI to include the digital content related to the entity information; and automatically causing, by the first device, over the network, the digital content related to the entity information to be displayed within a second portion of the UI displayed on the display of the second device of the first user, the digital content related to the entity information is simultaneously caused to be displayed within a portion of the UI displayed on a third device of the second user.

2. The method of claim 1, further comprising:

analyzing, by the first device, the text within the body of the message; and determining, by the first device, the context of the message.

3. The method of claim 2, wherein the digital content comprises information related to the context that corresponds to the entity.

4. The method of claim 3, further comprising:

determining, by the first device, a location related to the entity information, wherein the digital content further comprises a map displaying the location information in association with the context information.

5. The method of claim 1, further comprising:

further analyzing, by the first device, the text within the body of the message;

identifying, by the first device, a portion of the text; and determining, by the first device, an icon that corresponds to the portion.

6. The method of claim 5, further comprising:

modifying, by the first device, the message prior to the caused display within the first portion of the UI, the modification comprising inserting the icon at a position proximate to the portion of the text within the body of the message, wherein the modified message is caused to be displayed within the first portion of the UI.

7. The method of claim 6, wherein the icon comprises a linking feature that enables navigation to the third party website.

8. A non-transitory computer-readable storage medium tangibly encoded with computer-executable instructions, that when executed by a first device, performs a method comprising:

receiving, by the first device over a network, a message addressed to a first user from a second user, the message at least comprising text within a body of the message provided by the second user;

causing display, by the first device, of the message within a first portion of a user interface (UI), the first portion of the UI displayed on a display of a second device of the first user, the UI comprising functionality for toggling between the first portion and other portions of the UI;

analyzing, by the first device, the body of the message, and based on said analysis, identifying entity information from the text within the body, the entity information comprising content referencing an entity;

identifying, by the first device, digital content related to the entity information, the digital content comprises interactive content that enables navigation to a third party website that provides content related to a context of the message;

automatically modifying, by the first device, the display of the message within the first portion of the UI to include the digital content related to the entity information; and automatically causing, by the first device, over the network, the digital content related to the entity information to be displayed within a second portion of the UI displayed on the display of the second device of the first user, the digital content related to the entity information is simultaneously caused to be displayed within a portion of the UI displayed on a third device of the second user.

9. The non-transitory computer-readable storage medium of claim 8, further comprising:

analyzing, by the first device, the text within the body of the message; and determining, by the first device, the context of the message.

10. The non-transitory computer-readable storage medium of claim 9, wherein the digital content comprises information related to the context that corresponds to the entity.

11. The non-transitory computer-readable storage medium of claim 10, further comprising:

determining, by the first device, a location related to the entity information, wherein the digital content further comprises a map displaying the location information in association with the context information.

12. The non-transitory computer-readable storage medium of claim 8, further comprising:

further analyzing, by the first device, the text within the body of the message;

identifying, by the first device, a portion of the text; and determining, by the first device, an icon that corresponds to the portion.

13. The non-transitory computer-readable storage medium of claim 12, further comprising:

modifying, by the first device, the message prior to the caused display within the first portion of the UI, the modification comprising inserting the icon at a position proximate to the portion of the text within the body of the message, wherein the modified message is caused to be displayed within the first portion of the UI, wherein the icon comprises a linking feature that enables navigation to the third party website.

14. A computing device comprising:

a processor; and a non-transitory computer-readable storage medium for tangibly storing thereon program logic for execution by the processor, the program logic comprising:

logic executed by the processor for receiving, over a network, a message addressed to a first user from a second user, the message at least comprising text within a body of the message provided by the second user;

logic executed by the processor for causing display of the message within a first portion of a user interface (UI), the first portion of the UI displayed on a display of a device corresponding to the first user, the UI comprising functionality for toggling between the first portion and other portions of the UI;

logic executed by the processor for analyzing the body of the message, and based on said analysis, identifying entity information from the text within the body, the entity information comprising content referencing an entity;

logic executed by the processor for identifying digital content related to the entity information, the digital content comprises interactive content that enables navigation to a third party website that provides content related to a context of the message;

logic executed by the processor for automatically modifying the display of the message within the first portion of the UI to include the digital content related to the entity information; and logic executed by the processor for automatically causing, over the network, the digital content to be displayed within a second portion of the UI displayed on the display of the device of the first user, the digital content related to the entity information is simultaneously caused to be displayed within a portion of the UI displayed on a third device of the second user.

15. The computing device of claim 14, further comprising:

logic executed by the processor for further analyzing the text within the body of the message;

logic executed by the processor for identifying a portion of the text;

logic executed by the processor for determining an icon that corresponds to the portion; and logic executed by the processor for modifying the message prior to the caused display within the first portion of the UI, the modification comprising inserting the icon at a position proximate to the portion of the text within the body of the message, wherein the modified message is caused to be displayed within the first portion of the UI, wherein the icon comprises a linking feature that enables navigation to the third party website.

* * * * *